R. Solis.

Making Rubber Fabrics.

No 636 Reissued Dec. 14, 1858.

Witnesses:

W. J. H. Fuller
Meldrum C. Wagner

Inventor:

Thomas R. Day

UNITED STATES PATENT OFFICE.

RICHARD SOLIS, OF NEW YORK, N. Y.

MANUFACTURE OF ELASTIC CLOTH.

Specification forming part of Letters Patent No. 5,908, dated November 7, 1848; Reissued December 14, 1858, No. 636.

*To all whom it may concern:*

Be it known that I, RICHARD SOLIS, of the city, county, and State of New York, have invented a new and useful process for making elastic or giving elasticity to cloths, whether made of cotton, linen, silk, or other materials, and to other substances than cloth, such as leather, &c., called "Solis's invention for the manufacture of elastic goods," of which the following is a full and exact description.

Figure 1:
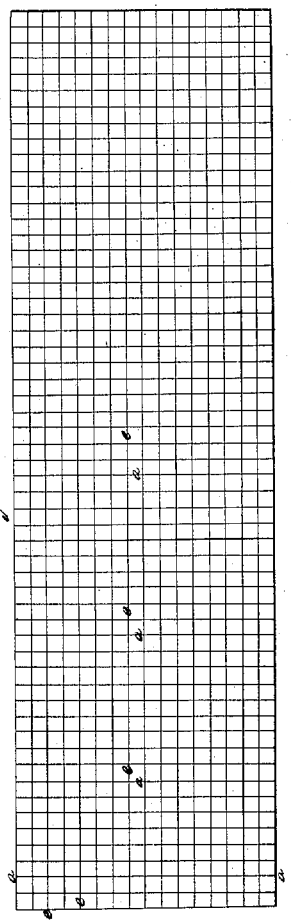
Figure 2:
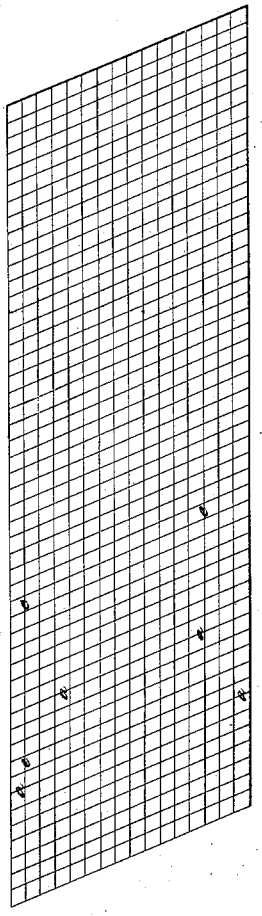
Figure 3:
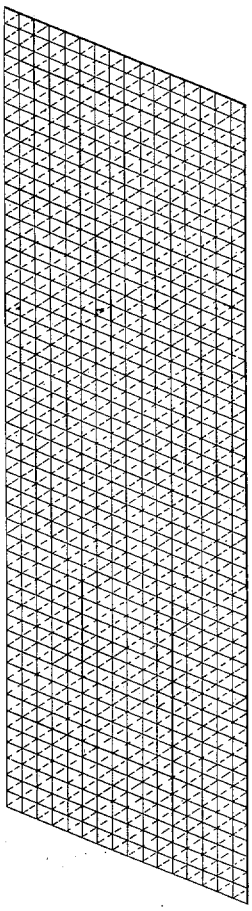

I take a piece of cloth of any fabric I wish to manufacture as is represented by Figure 1. In its ordinary state as it comes from the loom, the filling crosses the warp, at about right angles as in Fig. 1. (The long lines represent the warp and the short ones represent the filling.) I then draw or strain it in such a manner that the filling will cross the warp obliquely as in Fig. 2 in the drawing hereto annexed. Here the short lines represent the filling, and the long lines the warp and one crosses the other obliquely. One effect of drawing or straining the cloth in this manner is to diminish the width of the piece of cloth. I then place the gum elastic or india rubber in strips or sheets free of tension across the cloth or other fabric diagonally (as in Fig. 3 of drawing hereto annexed), there the long red lines represent the warp of the cloth and the short red lines the filling and the black lines represent the strips of rubber which cross the warp obliquely and also cross the filling obliquely. The strips of rubber cross the warp at about the same angle as the threads of filling cross it but in a different direction.

Having placed the strips or sheet of gum in this manner on the cloth, I fasten it thereto, with cement, gum or other adhesive substance. I then take another piece of cloth and having drawn or stretched it as I did the first so as that all the threads of this last piece when placed on the former will run parallel to and correspond as nearly as may be with those of the first piece, and having covered the side of this designed to be placed on the strips of gum or rubber with the cement I place that side on the strips or sheets of gum so that the threads of the last piece will run in the same direction with the threads of the first. I then press the whole together so that the cloths on both sides of the rubber shall touch it in every part, and the cloths shall touch each other at the intervals between the strips of gum or rubber (if it be in strips). This being done, the cloth in the direction in which the strips of rubber run will be capable of elongation or stretching sufficiently for the rubber in drawing it back to give it all the elasticity desirable for almost any purpose. The same may be done with leather or any other substance or fabric which is capable of being stretched.

I claim as new, and as my invention—

The mode of preparing the cloth for the rubber by stretching it in the above manner, and also the placing the rubber on the cloth obliquely as described.

In testimony whereof I the said RICHARD SOLIS hereto subscribe my name in the presence of the witnesses whose names are hereto subscribed the tenth day of October, A. D. 1848.

RICHARD SOLIS.

In the presence of—
LEWIS HURST,
WM. H. SPARKS.

[FIRST PRINTED 1913.]